73-633 SR

7/30/85 XR 4,531,412

United States Patent [19]

Prud'hon et al.

[11] Patent Number: 4,531,412

[45] Date of Patent: Jul. 30, 1985

[54] ULTRASONIC PROBE FOR ACCURATELY DETERMINING ANGULAR POSITION AND AN ECHOGRAPHY APPARATUS USING SUCH A PROBE

[75] Inventors: Lucien Prud'hon; Robert Bele, both of Meaux, France

[73] Assignee: CGR Ultrasonic, Paris, France

[21] Appl. No.: 507,454

[22] Filed: Jun. 24, 1983

[30] Foreign Application Priority Data

Jun. 29, 1982 [FR] France ................................ 82 11398

[51] Int. Cl.³ ................................ G01N 29/00

[52] U.S. Cl. ................................ 73/621; 73/633

[58] Field of Search ................................ 73/621, 633, 634; 128/660; 250/231 SE, 227; 324/208, 207; 318/602, 603, 640, 647

[56] References Cited

U.S. PATENT DOCUMENTS

| | | | |
|---|---|---|---|
| 3,281,825 | 10/1966 | Corl et al. | 324/208 |
| 3,843,915 | 10/1974 | Helmbold | 318/602 |
| 3,886,361 | 5/1975 | Wester | 250/231 GY |
| 4,092,867 | 6/1978 | Matzuk | 73/621 |
| 4,162,399 | 7/1979 | Hudson | 250/231 SE |
| 4,377,088 | 3/1983 | Evert | 73/633 |
| 4,379,221 | 4/1983 | Avins et al. | 250/231 SE |
| 4,399,703 | 8/1983 | Matzuk | 73/633 |
| 4,465,928 | 8/1984 | Breslow | 250/231 SE |

OTHER PUBLICATIONS

A. Shaw et al., "A Real Time 2-Dimensional Ultrasonic Scanner for Clinical Use", *Ultrasonics,* pp. 35–40, Jan. 1976.

T. Matzuk et al., "Novel Ultrasonic Real-Time Scanner Featuring Servo Controlled Transducers Displaying Sector Image", *Ultrasonics,* vol. 16, No. 4, pp. 171–176, Jul. 1978.

C. R. Hazell et al., "A Fibre Optical Angular Displacement Transducer", *Journal of Sci. Instr. (Journal of Physics E),* vol. 2, Series 2, pp. 110–111, Jan. 1969.

*Primary Examiner*—Stephen A. Kreitman
*Attorney, Agent, or Firm*—Cushman, Darby & Cushman

[57] ABSTRACT

An ultrasonic probe for accurately determining angular location includes a rotating mobile assembly with at least one angular location track placed thereon. The angular location track is inscribed with location data arranged in a succession of pulses. As the mobile assembly rotates, the track traces a path in space. A fixed reading unit is provided at a point along the path to read the data inscribed on the track. The read data contains information corresponding to the angular position of the mobile assembly at any given point in time.

19 Claims, 4 Drawing Figures

ULTRASONIC PROBE FOR ACCURATELY DETERMINING ANGULAR POSITION AND AN ECHOGRAPHY APPARATUS USING SUCH A PROBE

BACKGROUND OF THE INVENTION

1. Field of the Invention

The invention relates to an ultrasonic probe, with sectorial scanning, designed for transmitting ultrasonic bursts in different directions and receiving corresponding echoes; it relates more particularly to the means for angular location of the mobile assembly of the probe. The invention also relates to an improved echography installation comprising such a probe.

2. Description of the Prior Art

A conventional ultrasonic probe comprises a mobile assembly mounted rotatably about a shaft in a case and adapted to radiate an ultrasonic beam outwardly of the case and to receive the corresponding echoes so as to provide the complete exploration of a given sector of a sample, for reconstituting an image thereof. Thus, to each transmission-reception sequence made for a given angular position of the mobile assembly, there corresponds a "line" of the subsequently reconstituted image. The mobile assembly may be formed by the piezo-electric transducer itself or by a mirror reflecting the ultrasonic beam emitted by a fixed transducer. Sectorial scanning may be obtained by causing the mobile assembly to oscillate about its axis; an equivalent result may also be obtained by means of a cylindrical mobile assembly having several transducers and being rotated at a constant speed.

One of the problems arising with these types of probes (principally the oscillating probe) is the precise location of the angular position of the mobile assembly at any time, so as to always trigger off the transmission bursts or "shots" at the same angular positions, is difficult to determine. The accuracy of the mobile assembly during the respective positions of the different shots required for reconsituting an image forms an important characteristic affecting the quality of the image. Good accuracy allows the different lines to be correctly situated with respect to each other in the image and also the positions of the lines to be stabilized from one image to another. Attempts have been made to resolve this problem by linearizing as much as possible the oscillating movement of the mobile assembly by means of a servo-control chain looped to the drive motor of the mobile assembly. Another attempt consists simply in angularly locating the mobile assembly and triggering off the bursts from signals representative of this location. In both cases, the devices which have been associated with the motor (precision potentiometers, for example) either for providing the servo-control error signal or for giving concrete form to the angular location, are cumbersome and subject to drifting in time. The space occupied by such a device requires that it be disposed at a certain distance from the mobile assembly. The coupling is then necessarily provided by means of a mechanical change of direction system. Whatever the quality of execution of this system, the free motions can never be completely eliminated and play a particularly critical role in probes with an oscillating mobile assembly, since free motions come into play at each reversal of the direction of movement. This is one of the main causes of wear and of derangement of this type of probe.

Moreover, the accuracy of all such location devices supplying co-called "analog" signals is intrinsically limited so that use of incremental coders providing information usable by digital processing systems, appears more and more desirable. The invention provides a solution for the above-mentioned problems by proposing the adaptation of an incremental coder to a sectorial scanning mechanical probe.

SUMMARY OF THE INVENTION

More precisely, the invention relates then to an ultrasonic probe comprising a rotating mobile assembly, more especially an oscillating rotary assembly, generating sectorial scanning of an ultrasonic probe, wherein said mobile assembly carries at least one angular location track in which data are written, this location track describing a certain path determined by the movement of said mobile assembly and means for reading said data are disposed opposite a point of said path.

The above defined location track may be of a magnetic kind (a simple magnetic tape on which is recorded a succession of pulses forming an incremental magnetic code) or else of an optical kind (materialized by a succession of small reflecting zones separated by absorbing zones). Of course, in the first case, the above-mentioned reading means will be formed by a magnetic head whereas, in the second case, these reading means may be materialized by an arrangement of optical fibers connected to an opto-electric converter. Whatever the embodiment adopted, it will be readily understood that the means described form an extremely faithful and accurate incremental angular coder, capable of delivering electric pulse trains (after shaping and amplification) directly representative of the movement of the mobile assembly, each pulse representing a predetermined elementary angle of rotation. No drift in time of this type of incremental coding is to be feared because the angular location track is integral with the mobile assembly.

The pulse trains may be used in different ways.

In the first place, it is clear that the pulses may be used for triggering directly the ultrasonic bursts and driving the addressing means of a refreshing memory charged with storing the information resulting from the processing of the echoes received after each burst.

In this spirit, the invention also relates then to an echography apparatus including a probe according to the preceding definition and further including an excitation signal generator feeding an ultrasonic transducer of said probe, wherein said generator comprises synchronizing means one input of which is connected to the above-mentioned means for reading the data written in said angular location track.

It should be noted that the bursts thus synchronized by the pulses coming from said reading means, may be carried out without inconvenience on the outward and return movement of the mobile assembly, whereas the servo-control analog systems used previously very often only allowed a single effective scan per cycle because of technological difficulties in obtaining a perfectly symmetrical movement. One of the advantages of the present invention is that it allows an appreciable increase in the image production rate.

The pulses from the incremental coder associated with the probe may also be used for driving the means which provided control of the speed of the motor driving the mobile assembly. Thus, sudden accelerations are eliminated which could prevent certain echoes from being received and so upset the reconstitution of the image.

Finally, these pulses may be further used for driving the means which provided servo-control of the position of the motor driving the mobile assembly. In some examinations, particularly cardiac examinations, it is in fact desirable to immobilize the mobile assembly of the probe in a chosen firing position, (corresponding to a line of the image, so as to visualize the movements of the organ examined in this direction.

A positional servo-control, driven by the incremental coder associated with the mobile assembly itself considerably improves the accuracy and the stability of the orientation of the mobile assembly in such a type of examination.

BRIEF DESCRIPTION OF THE DRAWINGS

The invention will be better understood and other advantages will be clearer from the following description, made with reference to the accompanying drawings in which.

DESCRIPTION OF THE PREFERRED EMBODIMENTS

Figure 1:
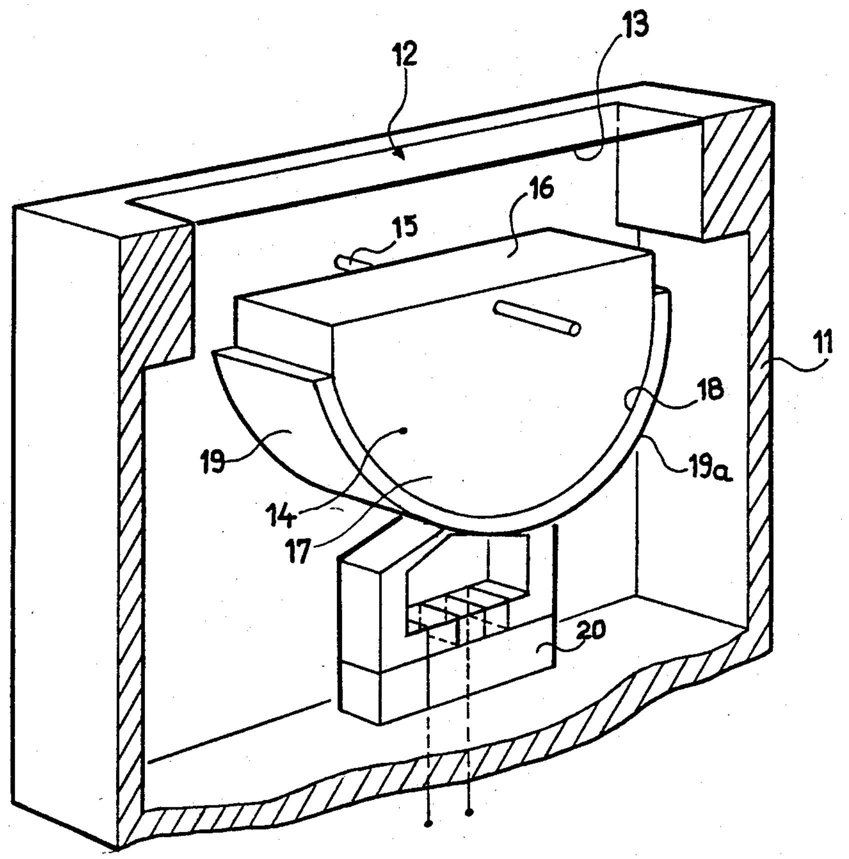
FIG. 1 is a perspective view, with parts cut away, of a first embodiment of an ultrasonic probe in accordance with the invention.

The probe shown in FIG. 1 comprises a case 11 having an opening 12 closed by means of a flexible acoustically transparent wall 13 opposite which a mobile assembly 14 is mounted for oscillation about a shaft 15. The oscillating mobile assembly 14 comprises a piezoelectric crystal 16 disposed in front of opening 12 and extended rearwardly of the case by a block of composite material 17. Conventionally, this block may be for example formed from a synthetic resin charged with a heavy material such as tungsten for absorbing the rear wave or on the contrary from a light material for reflecting it towards window 12 in phase with the front wave. According to the invention, this block 17 is shaped as a semi-cylinder with shaft 15 colinear with the axis of symmetry and the cylindrical lateral surface portion 18, parallel to this axis, carries an angular location track 19 on which data are written. This location track describes a certain path along an arc of a circle determined by the movement of the mobile assembly 14. Means 20 for reading said data are disposed opposite a point of this path. In the example of FIG. 1, the track 19 has been materialized by a magnetic tape section 19*a*. There is in fact recorded on this magnetic tape section a train of pulses of a strictly constant frequency. Each pulse is then representative of a predetermined angle of rotation of the mobile assembly. Of course, reading means 20 are here formed by a simple magnetic head whose air-gap is disposed opposite track 19. As will be seen further on with reference to FIG. 2, it may be advantageous to inscribe several tracks on the surface of the magnetic tape section 19*a*. In this case, the magnetic head 20 includes as many air-gaps as there are prerecorded tracks. Conventionally, the mobile assembly 14 is driven by means of a motor (not shown) through any suitable movement transformation mechanism. This motor 21 is however shown schematically in FIG. 4.

Figure 2:
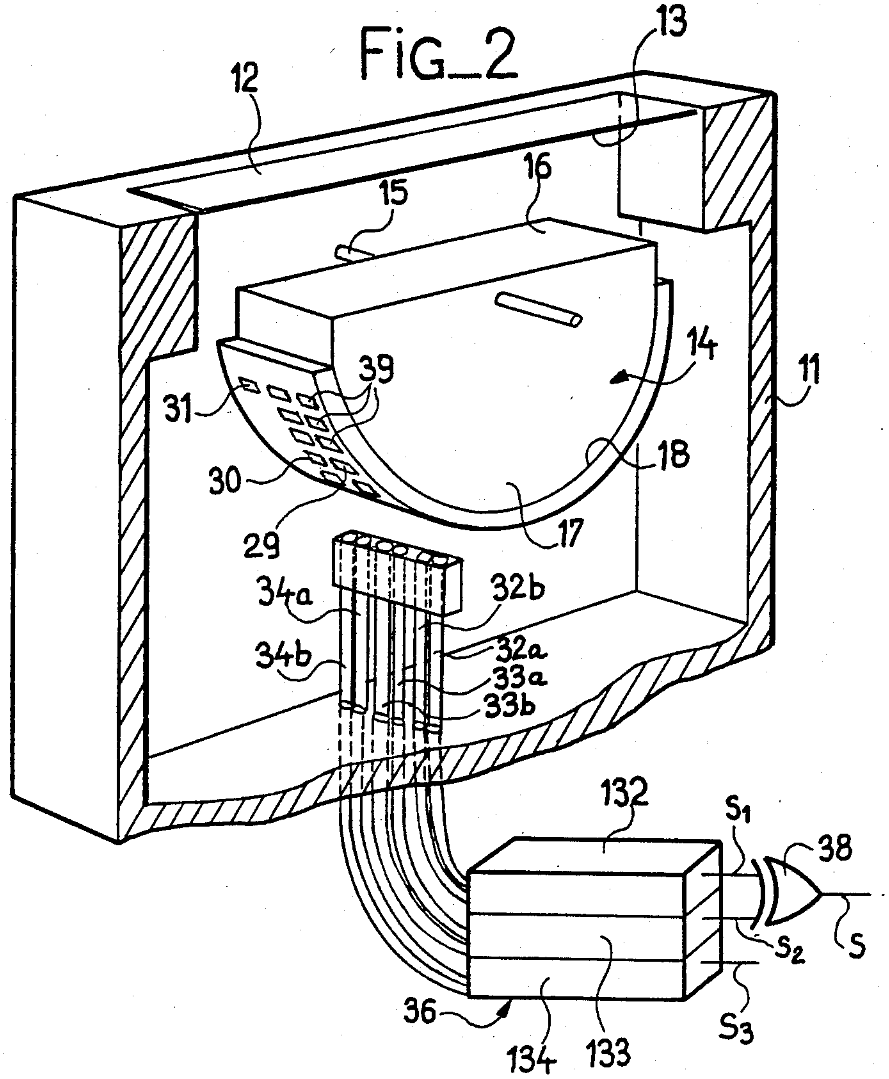
FIG. 2 is a perspective view, with parts cut away, of a second embodiment of an ultrasonic probe in accordance with the invention.
Figure 3:
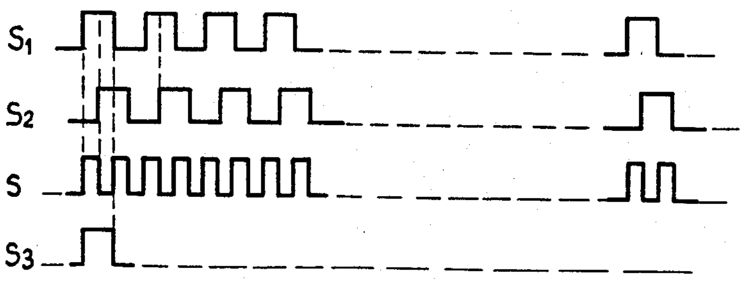
FIG. 3 illustrates the form of the electric signals derived from the incremental coder in an ultrasonic probe in accordance with the invention, for example that of FIG. 2.

In the second embodiment of the probe, shown in FIG. 2, similar structural elements bear the same numerical references and will not be described again. This probe is distnguished from the preceding one by the fact that the location tracks and the reading means are of an optical and not a magnetic kind. The lateral surface 18 of block 17 carries at least one and preferably two angular location tracks 29,30. Each track is materialized by a plurality of evenly spaced apart reflecting zones 39 separated by absorbing zones and the reading means comprise an arrangement of optical fibers 32, 33, 34 and an opto-electric converter 36. In the example shown, the fibers are paired and the two fibers of a pair have their ends disposed side by side opposite a location track, the opto-electric converter being coupled to the other ends of said fibers. In each pair of fibers, one fiber (32*a*, 33*a*, 34*a*) is associated with a light source (located inside the converter 36) whereas the other fiber (32*b*,33*b*,34*b*) is permanently coupled to an optical signal input of the converter. The converter comprises three identical sections 132,133,134 processing respectively the optical signals carried by the pairs of fibers 32,33 and 34. The three sections generate, respectively, an electrical signal output S1, S2 and S3. The optical fibers 32*a* and 32*b* have their ends disposed opposite track 29 whereas fibers 33*a* and 33*b* have their ends disposed opposite track 30. Fibers 34*a* and 34*b* have their ends disposed opposite an additional track 31 which comprises only a single reflecting zone, for example one end of the cylindrical surface 18. The role of this additional track is to generate a cycle beginning signal which appears periodically at the output S3 of the opto-electric converter. At each half cycle of the oscillating movement of the mobile assembly, two trains of electric pulses appear respectively at outputs S1 and S2. The reflecting zones of tracks 29 and 30 are staggered in phase by 90° so that this phase shift exits between the trains of electric pulses which are available simultaneously at outputs S1 and S2, as shown in FIG. 3. The outputs S1 and S2 are connected to two inputs of a gate of the exclusive OR type 38 so that the signal available at output S of this gate has a double frequency (see FIG. 3).

The feature of using signals staggered in phase by 90° on two parallel tracks read at the same time presents two advantages. The pitch of the angular coding is divided by two, as is shown clearly in FIG. 3, and the direction of the oscillating movement of mobile assembly 14 may also be known at any time as a function of the sign of the phase shift between the two signals available at outputs S1 and S2.

Of course, this multi-track arrangement is perfectly transposable to the embodiment of FIG. 1.

Figure 4:
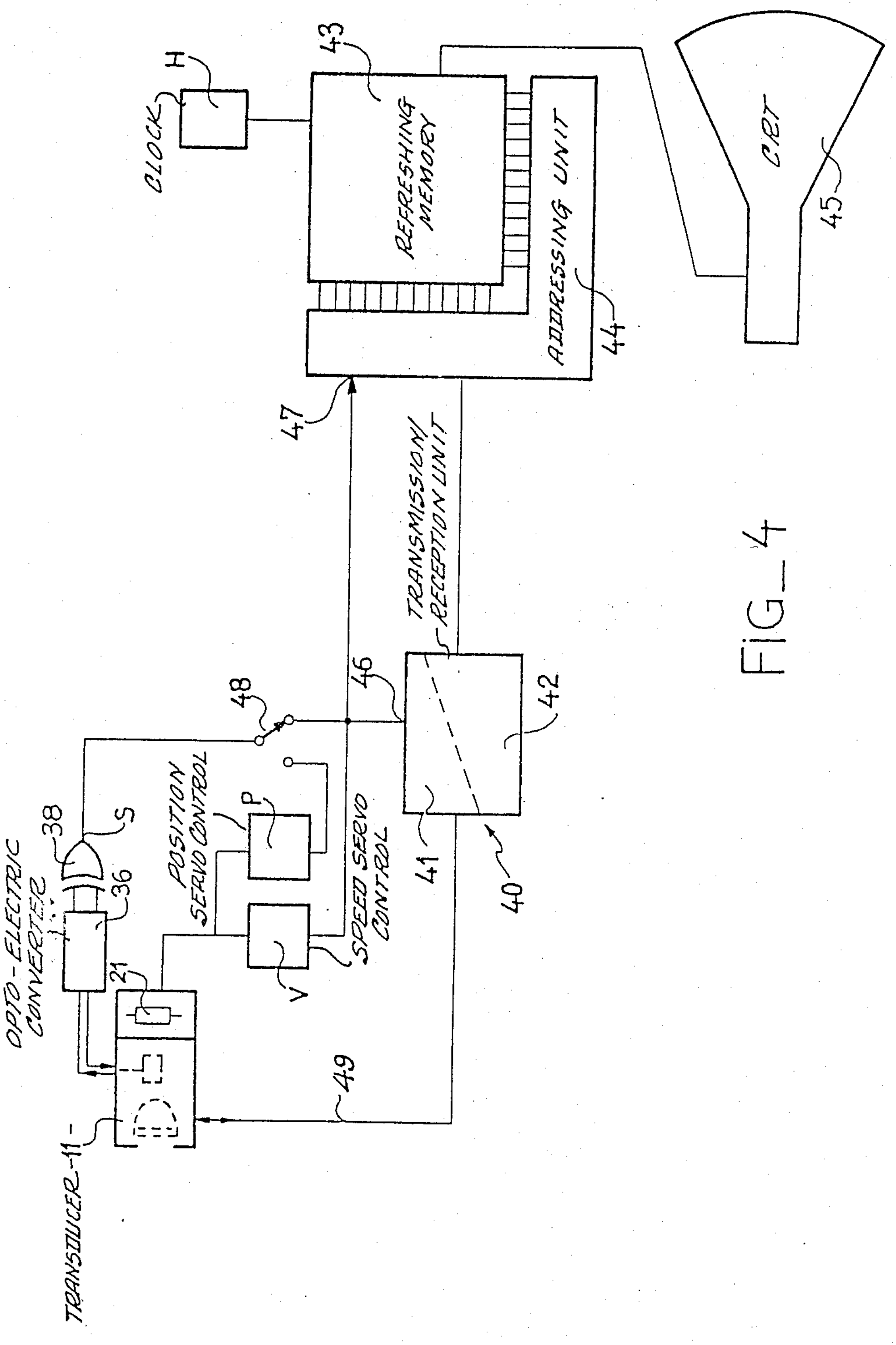
FIG. 4 is a simplified block diagram of echography apparatus equipped with a probe in accordance with the invention.

FIG. 4 shows an echography apparatus including a probe in accordance with FIG. 1 or 2. This apparatus comprises conventionally a transmission-reception unit 40, comprising an excitation signal generator 41 and a reception circuit 42, coupled (connection 49) to transducer 16. Circuit 42 receives and processes the echo signals received by the probe after each firing and elaborates digital data which are addressed to a refreshing memory 43 through addressing means 44. The refreshing memory 43 is read at the timing of a clock H so as to reconstitute an image on the screen of a cathode ray tube 45.

In another aspect of the invention, the excitation signal generator 41 comprises synchronizing means, one input 46 of which receives the signals elaborated by the reading means of the incremental coder of the probe. More precisely, input 46 is connected to the output S of the exclusive OR gate 38. Similarly, addressing means 44 includes a drive input 47 also connected to the output S of gate 38. Furthermore, as previously mentioned, the echography apparatus is completed by means providing servo-control of the speed V of motor 21 which means are themselves driven by the signals available at the output of gate 38. Finally, according to another advantageous possibility offered by the invention, it is possible to substitute positional servo-control means P for the speed servo-control means (switch 48) so as to stop the oscillating movement of the probe in a given angular position, the positional servo-control means being themselves driven by the signals available at the output S of gate 38.

In normal operation, the transmission-reception unit 40, the addressing means 44 and the speed controlled motor 21 are then driven by the pulse trains which appear at the output ends of gate 38 and all the digital data stored will be representative of the echoes received at very precise and invariable angular positions of the mobile assembly 14. Furthermore, when the positional servo-control means are brought into service by means of switch 48, counting the pulses delivered at the output S will allow the mobile assembly 14 to be brought into and held in a chosen angular position. In this mode of operation, it is not the image of the examined region which may be visualized but the evolution of the echoes along a very precise firing direction.

Of course, the invention is not limited to the probe and the echography apparatus which have just been described. In particular, in so far as the probe is concerned, it is clear that the means forming the incremental coder may be easily adapted to a wheel shaped probe comprising a plurality of piezo-electric transducers or its periphery. The angular location track(s) could be, in this case, easily disposed on a part of the lateral surface of the wheel carrying the transducers; the electric signals elaborated from such an incremental coder would then be more especially used for triggering ultrasonic bursts and for regulating the rotational speed of the wheel. Other modifications may be made, for example, in the embodiment of FIG. 2 where a pair of optical fibers has been shown associated with each angular location track. It could be easily contemplated to use only one optical fiber per track serving alternately for transmission and reception. That is to say, the invention covers all the technical equivalents of the means used if these equivalents are within the scope of the following claims.

We claim:

1. An ultrasonic probe comprising:

rotating mobile assembly means for performing sectorial scanning with an ultrasonic wave;

at least one angular location track formed on said mobile assembly means and inscribed with pulsed location data arranged in a succession of pulses, said angular location track describing a certain path determined by the movement of said mobile assembly; and means for reading said pulsed data disposed opposite a point on said path to determine the angular position of said mobile assembly means.

2. The probe as claimed in claim 1, wherein said mobile assembly means includes a cylindrical lateral surface portion carrying said angular location track.

3. The probe as claimed in claim 1, wherein said angular location track includes at least one magnetic track, and wherein said reading means includes at least one magnetic head.

4. An echography apparatus comprising:

a probe as claimed in claim 3; and an excitation signal generator feeding an ultrasonic transducer of said probe, and including a synchronizing means, having one input connected to said reading means, for synchronizing said mobile assembly means with said reading means.

5. The echography apparatus as claimed in claim 4, further including:

memory means, connected to said reading means, for storing said read data; and means for addressing said memory means, connected to said reading means and driven thereby.

6. The echography apparatus as claimed in claim 4, further including;

means for driving said mobile assembly means; and means for controlling the speed of said driving means, said speed control means being connected to said reading means and driven thereby.

7. The echography apparatus as claimed in claim 4, further including:

means for driving said mobile assembly means; and means for controlling the position of said driving means, said position control means being connected to said reading means and receiving therefrom signals which correspond to a given angular position of said mobile assembly means.

8. The probe as claimed in claim 1, further including an optoelectric converter and wherein said angular location track includes a plurality of evenly spaced apart optical reflecting zones separated by optical absorbing zones, and wherein said reading means includes at least one optical fiber having one end placed opposite said path, and a second end coupled to said optoelectric converter.

9. An echography apparatus comprising:

a probe as claimed in claim 8; and an excitation signal generator feeding an ultrasonic transducer of said probe, and including a synchronizing means, having one input connected to said reading means, for synchronizing said mobile assembly means with said reading means.

10. The echography apparatus as claimed in claim 9, further including:

memory means, connected to said reading means, for storing said read data; and means for addressing said memory means, connected to said reading means and driven thereby.

11. The echography apparatus as claimed in claim 9, further including;

means for driving said mobile assembly means; and means for controlling the speed of said driving means said speed control means being connected to said reading means and driven thereby.

12. The echography apparatus as claimed in claim 9, further including:

means for driving said mobile assembly means; and means for controlling the position of said driving means, said position control means being connected to said reading means and receiving therefrom signals which correspond to a given angular position of said mobile assembly means.

13. The probe as claimed in claim 8, further including a light source and wherein said at least one optical fiber includes two parallel optical fibers each having one end disposed opposite said path, one of said two optical fibers being permanently associated with said light source and a second one of said two optical fibers being permanently coupled to an optical signal input of said opto-electric converter.

14. The probe as claimed in claim 1, wherein said at least one angular location track includes two parallel angular location tracks, each track carrying a recorded periodic signal, the signals of said two tracks being staggered in phase by approximately 90°, and wherein said reading means includes means for reading said periodic signal from each said track.

15. The probe as claimed in claim 14, further including a third angular location track formed on said mobile assembly means and carrying a single recorded pulse, and wherein said reading means includes means for reading said single pulse.

16. An echography apparatus comprising:

a probe as claimed in claim 1; and an excitation signal generator feeding an ultrasonic transducer of said probe, and including a synchronizing means, having one input connected to said reading means, for synchronizing said mobile assembly means with said reading means.

17. The echography apparatus as claimed in claim 16, further including:

memory means, connected to said reading means, for storing said read data; and means for addressing said memory means, connected to said reading means and driven thereby.

18. The echography apparatus as claimed in claim 16, further including;

means for driving said mobile assembly means; and means for controlling the speed of said driving means, said speed control means being connected to said reading means and driven thereby.

19. The echography apparatus as claimed in claim 16, further including:

means for driving said mobile assembly means; and means for controlling the position of said driving means, said position control means being connected to said reading means and receiving therefrom signals which correspond to a given angular position of said mobile assembly means.

* * * * *